United States Patent
Zoch et al.

(10) Patent No.: US 7,172,652 B2
(45) Date of Patent: Feb. 6, 2007

(54) CARBON BLACK GRANULES

(75) Inventors: Heinz Zoch, Maintal (DE); Norbert Hornick, Schöllkrippen (DE); Alfons Karl, Gründau (DE); Silke Teike, Elsdorf (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 10/972,753

(22) Filed: Oct. 26, 2004

(65) Prior Publication Data

US 2005/0115463 A1 Jun. 2, 2005

(30) Foreign Application Priority Data

Oct. 28, 2003 (DE) ................. 103 50 188

(51) Int. Cl.
*C09C 1/56* (2006.01)
*C09D 11/02* (2006.01)

(52) U.S. Cl. .................. 106/476; 106/31.68; 106/31.9

(58) Field of Classification Search ............ 106/31.68, 106/31.9, 476; 524/495, 496
See application file for complete search history.

(56) References Cited

U.S. PATENT DOCUMENTS

| | | | |
|---|---|---|---|
| 4,397,652 A | 8/1983 | Neumann | 8/524 |
| 5,480,626 A | 1/1996 | Klasen et al. | 423/449.1 |
| 5,622,548 A * | 4/1997 | Zou et al. | 106/31.26 |
| 5,859,120 A | 1/1999 | Karl et al. | 524/495 |
| 5,872,177 A | 2/1999 | Whitehouse | 524/495 |
| 5,981,625 A * | 11/1999 | Zou et al. | 523/161 |
| 6,099,818 A | 8/2000 | Freund et al. | 423/449.1 |
| 6,268,407 B1 * | 7/2001 | Whitehouse et al. | 523/205 |

FOREIGN PATENT DOCUMENTS

| | | |
|---|---|---|
| DE | 195 31 565 | 1/1997 |
| DE | 196 13 796 | 10/1997 |
| EP | 0 807 669 | 11/1997 |
| EP | 1 293 543 | 3/2003 |
| JP | 63/066247 * | 3/1988 |
| WO | WO 96/21698 | 7/1996 |
| WO | WO 98/42778 | 10/1998 |
| WO | WO 98/45361 | 10/1998 |

OTHER PUBLICATIONS

Derwent abstract of JP 63/066247, Mar. 1988.*
Abstract for Reference B4, above.
Abstract for Reference B5, above.
Abstract for Reference B6, above.
Abstract for Reference B7, above.

* cited by examiner

*Primary Examiner*—Helene Klemanski
(74) *Attorney, Agent, or Firm*—Michael A. Sanzo; Law Office of Michael A. Sanzo, LLC

(57) ABSTRACT

The present invention is directed to carbon black granules containing a sorbitan triester. In addition, a process for the production of these carbon black granules is described, in which a powdered carbon black or beaded carbon black is beaded with a sorbitan triester. The carbon black granules can be used in polymer blends, lacquers, inks or pigments.

22 Claims, No Drawings

CARBON BLACK GRANULES

CROSS REFERENCE TO RELATED APPLICATIONS

The present application claims priority to German application DE 103 50 188.6, filed on Oct. 28, 2003, the contents of which is hereby incorporated by reference.

FIELD OF THE INVENTION

The present invention is directed to carbon black granules, as well as processes for their production and use.

BACKGROUND OF THE INVENTION

Carbon blacks are often produced as granulated products and, in this form are often referred to as carbon black granules, beaded carbon blacks or pelletized carbon blacks. The way in which granulations are performed will differ according to the structure and surface area of the carbon blacks. Thus, carbon blacks with a low structure agglomerate more easily than carbon blacks with a high structure.

U.S. Pat. No. 5,981,625 describes inks containing a dye with a particle size of 0.01 μm to 25 μm, a hydrocarbon resin, an oxidised polyethylene and a resin as binder. U.S. Pat. No. 4,397,652 describes a process for the production of inks containing an adhesive, selected from the group consisting of sorbitol, hydrogenated dextrose, glucose, lactose, neopentyl glycol, mannitol, mannose and polyethylene glycol, and a dust binder. In addition, a carbon black composition containing carbon black and a binder selected from the group comprising ethoxylated esters and polyethers is disclosed in WO 96/21698.

One disadvantage often encountered with carbon black beads is that they are usually difficult to disperse and have a low gloss when incorporated into printing inks. In addition, such printing inks tend to have poor flow properties, high water absorption and poor free running behaviour on printing plates.

SUMMARY OF THE INVENTION

The present invention is directed to carbon black granules which, when incorporated into printing inks, display a good dispersion state, high gloss, good flow properties, low water absorption and good free running behaviour on the printing plate. The carbon black granules are characterised by the presence of a triester of sorbitan and can be in bead form.

In its first aspect, the invention is directed to carbon black granules that include one or more carbon blacks and a sorbitan triester. Preferably the sorbitan triester is a triester of a saturated, unsaturated or polyunsaturated carboxylic acid, with the most preferred triesters being selected from: sorbitan trioleate; sorbitan trilaureate; sorbitan tristearate; sorbitan tripalmeate; and sorbitan triricinoleate. Any type of carbon black can be used in the granules, with those having a BET surface area of between 10 and 300 $m^2/g$ being preferred. In general the carbon black granules should contain 1 to 15 wt % (and preferably 3 to 7 wt %), of the sorbitan triester, relative to the carbon black.

The invention also includes a process for producing the carbon black granules described above. The process involves granulating a powdered carbon black or beaded carbon black with a sorbitan triester. Preferred carbon blacks have a BET surface area of between 10 and 300 $m^2/g$ and preferred sorbitan triesters include: sorbitan trioleate; sorbitan trilaureate; sorbitan tristearate; sorbitan tripalmeate; and sorbitan triricinoleate. The granulation may be carried out in a bead machine, ring-layer mix-pelletizer or bead drum.

In another aspect, the invention includes polymer blends, lacquers, inks or pigments having the carbon black granules described above. Of particular interest are printing inks containing the granules. These inks should contain 5 to 45 wt % (and preferably 10–25 wt %) of the carbon black granules.

DETAILED DESCRIPTION OF THE INVENTION

Any triester of a saturated, unsaturated or polyunsaturated carboxylic acid can be used as the sorbitan triester in the carbon black granules of the present invention. The carboxylic acids can be branched or unbranched. The most preferred triesters are: sorbitan trioleate; sorbitan trilaureate; sorbitan tristearate; sorbitan tripalmeate; and sorbitan triricinoleate. In general, the carbon black granules should contain 1 to 15 wt %, and preferably 3 to 7 wt %, of the sorbitan triester, relative to the carbon black granules. Prefered carbon black granules have a BET surface area of 10 to 300 $m^2/g$, and, more preferably 45 to 110 $m^2/g$.

The invention also provides a process for the production of carbon black granules in which a powdered carbon black or beaded carbon black is granulated with a sorbitan triester. Granulation can be performed in a ring-layer mix-pelletizer, a bead machine or a bead drum. Wet- or dry-beaded carbon blacks can be used as beaded carbon blacks.

The carbon black granules can be dried after granulation. The dryer temperature should preferably be between 100° and 250° C., and more preferably between 150° and 200° C. The temperature of the carbon black granules on leaving the dryer should generally be between 30° and 100° C., and preferably between 40° and 70° C. Optionally, the carbon black granules according to the invention can be post-beaded.

All types of carbon black can, in principle, be granulated with the process described herein. Furnace blacks, lamp blacks, gas blacks, channel black, thermal black, acetylene black, plasma black, inversion black (described in DE 195 21 565), Si-containing carbon blacks (described in WO 98/45361 or DE 19613796), or metal-containing carbon blacks (described in WO 98/42778), arc blacks and carbon-containing materials that are secondary products of chemical production processes can be used. Carbon blacks having BET surface areas of between 10 and 300 $m^2/g$ are preferably used. Printex® 25, Printex® 275, Printex® 30, Printex® 300, Printex® 35 and Printex® 45 from Degussa AG, are examples of suitable starting carbon blacks.

Sorbitan triesters can be dissolved, for example, in mineral oils or vegetable oils, (preferably oils that can be used in printing inks). In general, the sorbitan triester should be used as a 10–90 wt % solution. An additional binder can be added to the sorbitan triester. For example, resins or waxes, as well as numerous other substances, either alone or in combination with one another, can be added. However, in a preferred embodiment, no additional binder is added.

The carbon black granules of the present invention can be used in polymer blends e.g., rubber and plastics), lacquers, inks (particularly printing inks), pigments and many other applications which utilize carbon black. In a preferred application, the carbon black granules are used in oil-based offset printing inks.

The invention also encompasses the printing inks (particularly those for offset printing) that contain the carbon black granules described herein. These printing inks may also contain other conventional components, such as binders, solvents and diluents, as well as other auxiliary substances. Preferably the printing inks contain 5 to 45 wt %, and more preferably, 10 to 25 wt %, of carbon black granules. The printing inks can be produced by premixing the carbon black granules according to the invention with printing ink binders and then dispersing and grinding them.

The carbon black granules according to the invention have the advantage that, when incorporated into printing inks, they display a good dispersion state, high gloss, good flow properties, low water absorption and good free running behaviour on the printing plate.

EXAMPLES

Example 1–3

Production of Carbon Black Granules

The carbon black granules of the present invention may be produced by continuously feeding a starting carbon black to a heated ring-layer mix-pelletizer (RMG) by means of a gravimetric powder metering unit. The sorbitan trioleate is optionally heated to allow it to be pumped more readily and also to achieve better atomisation. The sorbitan trioleate is sprayed in with air by means of two-fluid atomisation using a feed nozzle which is 12.5 cm away from the centre of the carbon black filling nozzle. The partially granulated product discharged from the ring-layer mix-pelletizer is post-beaded in a granulating drum to round off the granules and to further reduce the fines. Printex 25 (Px25) is used as starting carbon black in Example 1, Printex 35 (Px35) in Example 2 and Printex 45 (Px45) in Example 3. In all three examples sorbitan trioleate (STO) is used as the sorbitan triester. The experimental conditions are described in Table 1.

TABLE 1

|  | Example 1 | Example 2 | Example 3 |
|---|---|---|---|
| Carbon black used | Px25 | Px35 | Px45 |
| RMG speed [rpm] | 260 | 320 | 260 |
| RMG inclination [°] | 10 | 10 | 10 |
| RMG temperature [° C.] | 110 | 50 | 110 |
| Sorbitan triester | STO | STO | STO |
| Amount of sorbitan triester [kg/h] | 1.56 | 1.04 | 1.56 |
| Temperature [° C.] | 100 | 40 | 100 |
| Post-granulation |  |  |  |
| Speed [rpm] | 20 | 20 | 20 |
| Duration [h] | 2 | 1 | 2 |

The analytical data for the carbon black beads is determined in accordance with the following standards:

| BET surface area | ASTM 6556-01a, |
| Fines: | ASTM D-1508-01 |
| Volatile matter 950° C. | DIN 53552 |
| Bead abrasion | DIN 53583 |
| Bulk density | DIN 53600 |

The analytical data for examples 1 to 3 is set out in Table 2.

TABLE 2

|  | Example 1 | Example 2 | Example 3 |
|---|---|---|---|
| BET [m$^2$/g] | 38.1 | 41.0 | 63.5 |
| Bulk density [g/l] | 472 | 520 | 408 |
| Volatile matter 950° C. [%] | 4.0 | 4.8 | 3.6 |
| Fines [%] | 5.9 | 13.7 | 7.6 |
| Bead abrasion [%] | 1.2 | 1.3 | 5.5 |

Comparative Examples 4–6

The same starting carbon blacks as used in Examples 1–3, but without the addition of additive, are granulated as Comparative Examples. The experimental conditions are described in Table 3.

TABLE 3

|  | Example 4 | Example 5 | Example 6 |
|---|---|---|---|
| Carbon black used | Px25 | Px35 | Px45 |
| RMG speed [rpm] | 260 | 300 | 260 |
| RMG inclination [°] | 10 | 10 | 10 |
| RMG temperature [° C.] | 110 | 110 | 110 |
| Sorbitan triester | None | none | none |
| Post-granulation |  |  |  |
| Speed [rpm] | 20 | 20 | 20 |
| Duration [h] | 2.5 | 2.5 | 2.5 |

The analytical data for Comparative Examples 4 to 6 is set out in Table 4.

TABLE 4

|  | Example 4 | Example 5 | Example 6 |
|---|---|---|---|
| BET [m$^2$/g] | 48.5 | 60.0 | 88.5 |
| Bulk density [g/l] | 408 | 436 | 300 |
| Volatile matter 950° C. [%] | 0.8 | 0.5 | 0.8 |
| Fines [%] | 3.4 | 2.2 | 1.8 |
| Bead abrasion [%] | 5.6 | 9.3 | 2.1 |

The carbon black granules according to the invention (Examples 1–3) display a higher bulk density in comparison to the Comparative Examples (Examples 4–6).

Example 7–9

For examples 7 to 9 the additive is applied to dry-beaded carbon black. To this end, dry-beaded carbon black from Examples 4 to 6 is placed in the granulating drum. The sorbitan trioleate is heated to 80° C. to allow it to be pumped more readily and also to achieve better atomisation. With the drum rotating, the sorbitan trioleate is sprayed with air onto the carbon black bed by means of two-fluid atomisation. When the addition is completed, the drum is allowed to run for a further 10 minutes. The experimental conditions are described in Table 5.

TABLE 5

|  | Example 7 | Example 8 | Example 9 |
|---|---|---|---|
| Carbon black used | Px25 | Px35 | Px45 |
| Amount [kg] | 1.6 | 1.6 | 1.6 |
| Sorbitan triester | STO | STO | STO |
| Amount of sorbitan triester [g] | 160 | 160 | 160 |
| Temperature [° C.] | 80 | 80 | 80 |

TABLE 5-continued

|  | Example 7 | Example 8 | Example 9 |
|---|---|---|---|
| Atomiser air [Nm³/h] | 2 | 2 | 2 |
| Speed [rpm] | 20 | 20 | 20 |
| Post-granulation time [min] | 10 | 10 | 10 |

The analytical data for Comparative Examples 7 to 9 is set out in Table 6.

TABLE 6

|  | Example 7 | Example 8 | Example 9 |
|---|---|---|---|
| BET [m²/g] | 32.6 | 36.9 | 54.7 |
| Volatile matter 950° C. [%] | 7.4 | 6.8 | 6.8 |
| Fines [%] | 1.5 | 3.5 | 1.4 |
| Bead abrasion 20 min [%] | 1.1 | 2.5 | 0.8 |

Example 10–12

Offset Printing Ink

The following components are mixed in a high-speed mixer:

| 12.8% | ER resin 125 |
| 12.0% | Necires LF 220/130 |
| 10.4% | Albertol KP 172 |
| 10.4% | Setalin V402 |
| 0.4% | Cycloxim FF |
| 26.0% | Automotive oil F 4/7 |
| 8.0% | Automotive oil F 6/9 |

ER resin 125 is a hydrocarbon compound from American Gilsonite Company USA (supplied by Worlee Chemie GmbH Hamburg). Necires LF 220/130 is a hydrocarbon resin from Nevcin Polymers B.V. Holland. Albertol KP 172 is a phenolic resin-modified colophony resin from Solutia Germany GmbH & Co. KG Germany. Setalin V402 is an alkyd resin from Akzo Nobel Resins Holland. Cycloxim FF is a cyclohexanone oxime from Acima AG Switzerland. Automotive oil F 4/7 is an acid-treated petroleum distillate from Haltermann Products Hamburg. Automotive oil F 6/9 is an acid-treated petroleum distillate from Haltermann Products Hamburg.

After the components have been thoroughly mixed, a further 20.0% carbon black is added. After being predispersed for 15 minutes in the high-speed mixer (Getzmann), the mixture is then ground in a mill (Netzsch Attritor) with 3 mm steel balls until the grindometer fineness is below 5 µm. The carbon blacks used in the printing inks are listed in Table 7.

TABLE 7

| Printing inks: | Example 10 | Example 11 | Example 12 |
|---|---|---|---|
| Carbon black from | Example 7 | Example 8 | Example 9 |

The viscosity, yield point and flow behaviour of the printing ink is shown in Table 8.

TABLE 8

| Printing inks: | Example 10 | Example 11 | Example 12 |
|---|---|---|---|
| Viscosity [Pa s] | 10.3 | 14.3 | 16.2 |
| Yield point [Pa] | 121 | 67 | 93 |
| Flow 90° 5 min [mm] | 201 | 152 | 130 |

After deaeration using a triple roller mill, the printing ink is applied to paper in a test model printing device. The ink is applied in a 1.5 g/m² layer onto APCO paper. After 24 h the optical density, gloss and yellow value b* in accordance with CieLab are determined on the dried print (Table 9).

TABLE 9

| Printing inks: | Example 10 | Example 11 | Example 12 |
|---|---|---|---|
| Density | 2.04 | 2.10 | 2.19 |
| Gloss 60° | 91 | 92 | 96 |
| B* value | 0.07 | 0.13 | 0.28 |

Comparative Examples 13–15

For the sake of comparison, the carbon black granules according to example 4 to 6 are likewise used in printing inks in an analogous way to Examples 10 to 12, and the inks are analysed (Table 10).

TABLE 10

| Printing inks: | Example 13 | Example 14 | Example 15 |
|---|---|---|---|
| Carbon black from | Example 4 | Example 5 | Example 6 |

The viscosity, yield point and flow behaviour of the printing ink is determined and shown in Table 11.

TABLE 11

| Printing inks: | Example 13 | Example 14 | Example 15 |
|---|---|---|---|
| Viscosity [Pa s] | 17.8 | 17.6 | 22.3 |
| Yield point [Pa] | 111 | 99 | 121 |
| Flow 90° 5 min [mm] | 137 | 136 | 117 |

After deaeration using a triple roller mill, the printing ink is applied to paper in a test model printing device. The ink is applied in a 1.5 g/m² layer onto APCO paper. After 24 h the optical density, gloss and yellow value b* in accordance with CieLab are determined on the dried print (Table 12).

TABLE 12

| Printing inks: | Example 13 | Example 14 | Example 15 |
|---|---|---|---|
| Density | 2.04 | 2.08 | 2.19 |
| Gloss 60° | 88 | 87 | 88 |
| B* value | −0.50 | −0.22 | −0.22 |

The printing inks (Examples 10–12) with the carbon black granules according to the invention display an improved, lower viscosity, better flow and higher gloss than the printing inks of the comparative examples.

Example 16

In a manner analogous to Examples 7 to 9, Printex 275 (Px275, furnace black with a BET surface area of 53.3 m²/g) is used as the starting carbon black and a granulated carbon black is produced with sorbitan trioleate (Table 13).

TABLE 13

| Experimental conditions: | Example 16 |
|---|---|
| Carbon black used | Px275 |
| Amount [kg] | 1.6 |
| Additive | STO |
| Amount [g] | 160 |
| Temperature [° C.] | 80 |
| Atomiser air [Nm³/h] | 2 |
| Speed [rpm] | 20 |
| Post-granulation time [min] | 10 |

The analytical data for Example 16 is set out in Table 14.

TABLE 14

| | Example 16 |
|---|---|
| Volatile matter 950° C. [%] | 7.0 |
| Overall bead hardness [kg] | 5 |
| Bulk density [g/l] | 603 |

Example 17–18

As in examples 10–12, the Printex 275 granulated with sorbitan trioleate from Example 16 and conventionally dry-beaded starting carbon black Printex 275 are incorporated into printing inks (Table 15).

TABLE 15

| Printing inks: | Example 17 | Example 18 |
|---|---|---|
| Carbon black from | Example 16 | Px275 |

The behaviour with regard to water is analysed using a Tack-O-Scope (Table 16).

TABLE 16

| Printing inks: | Example 17 | Example 18 |
|---|---|---|
| Tack before | 160 | 160 |
| Tack of water | 10 | 10 |
| Tack after | 115–125 | 95–110 |

The printing ink (Example 17) with the carbon black granules according to the invention displays a higher tack after contact with water than the printing ink (Example 18) with the comparative carbon black.

Example 19–20

Two printing inks are produced with commercial Printex 35 as described in Examples 10–12.5% sorbitan trioleate (Example 19) and 5% sorbitan monooleate (Example 20), relative to carbon black, are used in the production. The behaviour of both inks with regard to water is analysed using a Tack-O-Scope (Table 17).

TABLE 17

| Printing inks: | Example 19 | Example 20 |
|---|---|---|
| Tack before | 138 | 120 |
| Tack of water | 13 | 15 |
| Tack after | 105 | 90 |
| Drive roller | runs freely | does not run freely |
| Water absorption | good (low) | poor (high) |

The printing ink (Example 19) with the carbon black granules according to the invention displays a higher tack, which is also higher even after contact with water, as well as lower water absorption and better free running behaviour.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. A dry composition comprising granules of one or more carbon blacks and one or more sorbitan triesters other than sorbitan trioleate and sorbitan tristearate.

2. The dry composition of claim 1, wherein said sorbitan triester is a triester of a saturated, unsaturated or polyunsaturated carboxylic acid.

3. The dry composition of claim 1, wherein said sorbitan triester is selected from the group consisting of: sorbitan trilaureate; sorbitan tripalmeate; and sorbitan triricinoleate.

4. The dry composition of any one of claims 1–3, wherein said granules of one or more carbon blacks contain 1 to 15 wt %, of sorbitan triester, relative to the carbon black granules.

5. The dry composition of claim 4, wherein said granules of one or more carbon blacks contain 3 to 7 wt %, of the sorbitan triester, relative to the carbon black granules.

6. A process for the production of the dry composition of claim 1, comprising granulating a powdered carbon black or beaded carbon black with a sorbitan triester.

7. The process of claim 6, characterised in that the carbon black used in said carbon black granules has a BET surface area of between 10 and 300 m²/g is used.

8. The process of claim 6, wherein said sorbitan triester is selected from the group consisting of: sorbitan trilaureate; sorbitan tripalmeate; and sorbitan triricinoleate.

9. The process of claim 6, wherein granulation is performed in a bead machine, ring-layer mix-pelletizer or bead drum.

10. A polymer blend, lacquer, or pigment comprising the carbon black granules of one or more carbon blacks and one or more sorbitan triesters.

11. A printing ink comprising carbon black granules from a dry composition comprising granules of one or more carbon blacks and one or more sorbitan triesters.

12. The printing ink of claim 11, wherein said carbon black granules comprise 5 to 45 wt % of said printing ink.

13. The printing ink of claim 12, wherein said carbon black granules comprise 10 to 25 wt % of said printing ink.

14. A carbon black granule comprising one or more carbon blacks and one or more sorbitan triesters other than sorbitan trioleate and sorbitan tristearate and with the proviso that said carbon black granule does not comprise any additional binder.

15. The carbon black granule of claim 14, wherein said one or more sorbitan triesters are selected from the group consisting of: sorbitan trilaureate; sorbitan tripalmeate; and sorbitan triricinoleate; and wherein said sorbitan triesters comprise 1 to 15 wt. % of said carbon black granule relative to said carbon black.

16. A process for making a printing ink, comprising mixing a dry composition with a liquid comprising water, oil or a mixture of oil and water wherein said dry composition comprises granules of one or more carbon blacks and one or more sorbitan triesters.

17. The process of claim 16, wherein said dry composition of claim 1 is added in an amount sufficient to produce a printing ink comprising 5 to 45 wt % carbon black granules.

18. The process of claim 17, wherein said dry composition of claim 1 is added in an amount sufficient to produce a printing ink comprising 10–25 % carbon black granules.

19. The printing ink of claim 11, wherein said sorbitan triester is a triester of a saturated, unsaturated or polyunsaturated carboxylic acid.

20. The printing ink of claim 11, wherein said sorbitan triester is selected from the group consisting of: sorbitan trioleate; sorbitan trilaureate; sorbitan tristearate; sorbitan tripalmeate; and sorbitan triricinoleate.

21. The printing ink of claim 20, wherein said granules of one or more carbon blacks contain 3 to 7 wt % of the sorbitan triester relative to the carbon black granules.

22. The printing ink of claim 21, wherein said carbon black granules comprise 5 to 45 wt. % of said printing ink.

\* \* \* \* \*